United States Patent
Meyer-Ebeling

(10) Patent No.: US 9,381,798 B2
(45) Date of Patent: Jul. 5, 2016

(54) BATTERY SYSTEM AND MOTOR VEHICLE

(71) Applicant: Dr. Ing. h.c. F. Porsche Aktiengesellschaft, Stuttgart (DE)

(72) Inventor: Joerg Meyer-Ebeling, Stuttgart (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/730,827

(22) Filed: Jun. 4, 2015

(65) Prior Publication Data

US 2015/0266368 A1    Sep. 24, 2015

Related U.S. Application Data

(63) Continuation-in-part of application No. 12/984,654, filed on Jan. 5, 2011.

(30) Foreign Application Priority Data

Jan. 14, 2010  (DE) .......... 10 2010 004 549

(51) Int. Cl.
*B60R 16/04* (2006.01)
*B60K 1/04* (2006.01)
*B60L 11/18* (2006.01)
*B60R 5/00* (2006.01)

(52) U.S. Cl.
CPC .............. *B60K 1/04* (2013.01); *B60L 11/1822* (2013.01); *B60L 11/1868* (2013.01); *B60L 11/1877* (2013.01); *B60R 5/00* (2013.01); *B60K 2001/0416* (2013.01); *B60K 2001/0438* (2013.01); *B60K 2001/0455* (2013.01); *B60K 2001/0472* (2013.01); *Y02T 10/7005* (2013.01); *Y02T 10/7066* (2013.01); *Y02T 10/7072* (2013.01); *Y02T 90/124* (2013.01); *Y02T 90/14* (2013.01)

(58) Field of Classification Search
CPC ..... B62D 25/08; B60L 11/18; B60L 11/1822; B60L 11/1868; B60L 11/1877
USPC ........................................................ 180/68.5
See application file for complete search history.

(56) References Cited

U.S. PATENT DOCUMENTS

| | | |
|---|---|---|
| 2,094,401 A | 9/1937 | Girl |
| 2,805,807 A | 9/1957 | Slack |
| 3,190,387 A | 6/1965 | Douglas |
| 3,241,019 A | 3/1966 | Gross |
| 3,497,027 A | 2/1970 | Wild |
| 3,690,397 A | 9/1972 | Parker et al. |

(Continued)

FOREIGN PATENT DOCUMENTS

| | | |
|---|---|---|
| DE | 2805134 | 8/1979 |
| DE | 4140508 | 6/1993 |

(Continued)

*Primary Examiner* — Hau Phan
(74) *Attorney, Agent, or Firm* — Gerald E. Hespos; Michael J. Porco; Matthew T. Hespos

(57) ABSTRACT

A battery system for driving an electric motor of a hybrid vehicle or of an electric vehicle has an exchangeable auxiliary battery to improve the comfort, performance and/or the range of the vehicle. The auxiliary battery can be placed from below into a space beneath the trunk compartment floor. The trunk compartment floor is vertically movable to increase the size of the trunk compartment when the auxiliary battery is not being used.

8 Claims, 1 Drawing Sheet

(56) References Cited

U.S. PATENT DOCUMENTS

| | | |
|---|---|---|
| 4,198,091 A | 4/1980 | Appleton |
| 4,489,242 A | 12/1984 | Worst |
| 4,799,849 A | 1/1989 | Miller |
| 5,373,910 A | 12/1994 | Nixon |
| 5,967,584 A | 10/1999 | McCarthy et al. |
| 5,998,963 A | 12/1999 | Aarseth |
| 6,155,625 A | 12/2000 | Felix |
| 7,281,743 B2 | 10/2007 | Weiland |
| 7,688,582 B2 | 3/2010 | Fukazu et al. |
| 7,748,775 B2 | 7/2010 | Mercurio |
| 7,913,788 B1 | 3/2011 | Bryer et al. |
| 2003/0209375 A1 | 11/2003 | Suzuki et al. |
| 2005/0134075 A1* | 6/2005 | Kim .......................... 296/37.16 |
| 2005/0140156 A1 | 6/2005 | Mulvihill |
| 2009/0090575 A1 | 4/2009 | Nagasaka |
| 2009/0167045 A1 | 7/2009 | Storgato et al. |
| 2009/0205891 A1 | 8/2009 | Parrett et al. |
| 2009/0242298 A1 | 10/2009 | Guss et al. |
| 2010/0147604 A1 | 6/2010 | Sakita |
| 2010/0181129 A1 | 7/2010 | Hamidi |
| 2012/0037437 A1 | 2/2012 | Fernandez-Mateo |

FOREIGN PATENT DOCUMENTS

| | | |
|---|---|---|
| DE | 4206360 | 9/1993 |
| DE | 9410158 | 10/1994 |
| DE | 10132191 | 1/2003 |
| DE | 10255545 | 6/2004 |
| DE | 10261393 | 7/2004 |
| DE | 1020066011537 | 9/2007 |
| DE | 102009009150 | 9/2009 |
| DE | 102008034069 | 1/2010 |
| EP | 1012002 | 3/2003 |
| EP | 2033846 | 3/2009 |
| FR | 2880476 | 7/2006 |
| JP | 03-155308 | 7/1991 |
| JP | 04-334906 | 11/1992 |
| JP | 06-048184 | 2/1994 |
| JP | 10322806 | 12/1998 |
| JP | 2002-012083 | 1/2002 |
| JP | 3163036 | 9/2010 |
| KR | 591530 B1 | 6/2006 |

* cited by examiner

BATTERY SYSTEM AND MOTOR VEHICLE

CROSS-REFERENCE TO RELATED APPLICATION

This application is a continuation-in-part of U.S. patent application Ser. No. 12/984,654, filed Jan. 5, 2011, which claims priority under 35 USC 119 to German Patent Application No. 10 2010 004 549.7, filed on Jan. 14, 2010, the entire disclosures of which is incorporated herein by reference.

BACKGROUND OF THE INVENTION

1. Field of the Invention

The invention relates to a battery system having at least one battery for driving an electric motor of a hybrid vehicle or of an electric vehicle. The invention also relates to a motor vehicle having an electric motor that can be driven by a battery system. The invention further relates to a motor vehicle having a trunk compartment that is delimited at the bottom by a movable trunk compartment floor, and having an electric power source arranged beneath the trunk compartment floor.

2. Description of the Related Art

European patent specification EP 1 012 002 B1 discloses a cover designed in the manner of a suitcase-like hollow body for a vehicle storage compartment. At least one transportation container is an integral part of the hollow body and is designed to accommodate loads between at a suitcase lid and a suitcase base. The suitcase lid can be pivoted relative to the suitcase base. The suitcase lid or the suitcase base can have at least one pocket designed to accommodate at least one battery or at least one rechargeable battery. The suitcase lid can be locked in different pivot positions in relation to the suitcase base.

European patent application EP 2 033 846 A2 discloses a storage compartment for a vehicle. The storage compartment has a housing and an upper edge region of the housing forms a support surface for a loading floor cover that extends at least from the housing to a storage compartment edge associated with a rear section. In this way, storage compartments that are fitted with batteries, for example, can be utilized more effectively for accommodating further loads.

German laid-open specification DE 10 2009 009 150 A1 discloses a motor vehicle having a trunk compartment and a trunk compartment floor beneath which an energy storage system is arranged. The energy storage system comprises one or more batteries arranged in a concealed manner below an external battery housing.

The object of the invention is to improve the comfort, performance and/or the range of a motor vehicle, in particular a hybrid vehicle or of an electric vehicle that has an electric motor.

SUMMARY OF THE INVENTION

The invention relates to a battery system having at least one battery for driving an electric motor of a hybrid vehicle or of an electric vehicle. The battery system comprises an exchangeable component battery system. The entire battery system preferably is not exchangeable. Rather, only the component battery system is exchangeable. The exchangeable component battery system can be used, for example, to reduce or increase the range of the hybrid vehicle or of the electric vehicle. A driver of the hybrid vehicle or electric vehicle can consider and make a decision as to whether he requires a relatively high or relatively low battery capacity before a journey or during a journey. Thus, new energy can be provided in the hybrid vehicle or electric vehicle in a simple manner repeatedly, quickly and without protracted charging merely by changing the component battery system. In the case of a relatively low energy requirement, the component battery system also can be omitted entirely to reduce the weight and therefore the power/weight ratio of the hybrid vehicle or of the electric vehicle and to increase the size of the storage compartment of the hybrid vehicle or of the electric vehicle. Furthermore, energy storage means with different power/energy characteristics can be used in the component battery system. Therefore, the E-system can be equipped to sometimes be directed at power and to sometimes be directed at energy capacity.

The exchangeable component battery system preferably comprises at least one exchangeable auxiliary battery in addition to a supply battery. The supply battery functions to supply electrical power to the electric vehicle or hybrid vehicle. The auxiliary battery can be inserted selectively into or removed from the electric vehicle or hybrid vehicle. The electric vehicle or hybrid vehicle has a greater range when the auxiliary battery is inserted. The electric vehicle or hybrid vehicle is lighter and can be moved more dynamically and/or have a greater amount of usable trunk space when the auxiliary battery is not inserted.

The invention also relates to a motor vehicle having an electric motor that can be driven by the above-described battery system. The motor vehicle preferably is a hybrid vehicle or an electric vehicle.

The motor vehicle may have a trunk compartment delimited at the bottom by a movable trunk compartment floor, and may have an electric power source beneath the trunk compartment floor. An accommodation space for at least one auxiliary battery of the above-described battery system preferably is provided beneath the trunk compartment floor. "At the bottom" means toward the ground when the motor vehicle is on the ground.

The trunk compartment floor of the motor vehicle preferably can be adjusted vertically to change the size of the accommodation space in accordance with requirements. The trunk compartment floor is, for example, guided between two extreme positions in a movable manner.

The trunk compartment floor of the motor vehicle preferably is arranged right at the bottom in a loading position to provide the maximum possible trunk compartment volume. The accommodation space is reduced to zero in the loading position of the trunk compartment floor and an additional battery is not arranged in the accommodation space.

The trunk compartment floor of the motor vehicle preferably can be moved up to a battery position so that the accommodation space accommodates the auxiliary battery. The accommodation space containing the auxiliary battery is partitioned off from the trunk compartment by the trunk compartment floor.

The trunk compartment floor of the motor vehicle may be configured to be adjusted manually to at least two different vertical positions. More particularly, the trunk compartment floor preferably can be fixed in its loading position and in its battery position in a simple manner. If required, the trunk compartment floor also can be fixed in intermediate positions to accommodate, for example, auxiliary batteries of a different size.

The trunk compartment floor of the motor vehicle may be adjusted vertically by motor, such as an electric motor, and particularly an actuating motor, possibly using a suitable gear mechanism.

The accommodation space of the motor vehicle may be accessible from below to insert, remove or exchange the auxiliary battery. To this end, the accommodation space can have an opening at the bottom and the auxiliary battery may fit through the opening. The opening can be closed, for example, by a removable or pivotable cover.

Further advantages, features and details of the invention can be gathered from the following description in which an exemplary embodiment is described in detail with reference to the drawings.

DETAILED DESCRIPTION OF THE PREFERRED EMBODIMENT

Figure 1:
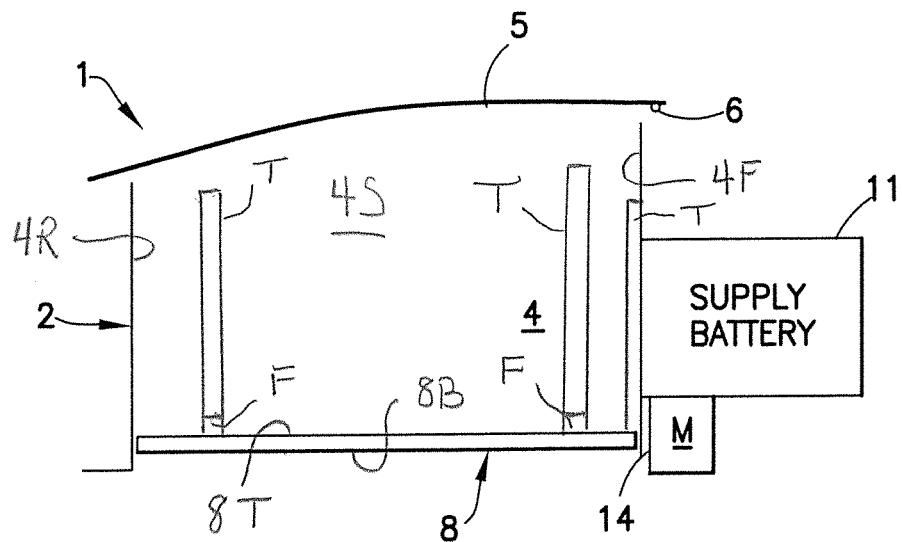
FIG. 1 is a highly simplified illustration of the motor vehicle having a trunk compartment and a trunk compartment floor in a loading position.
Figure 2:
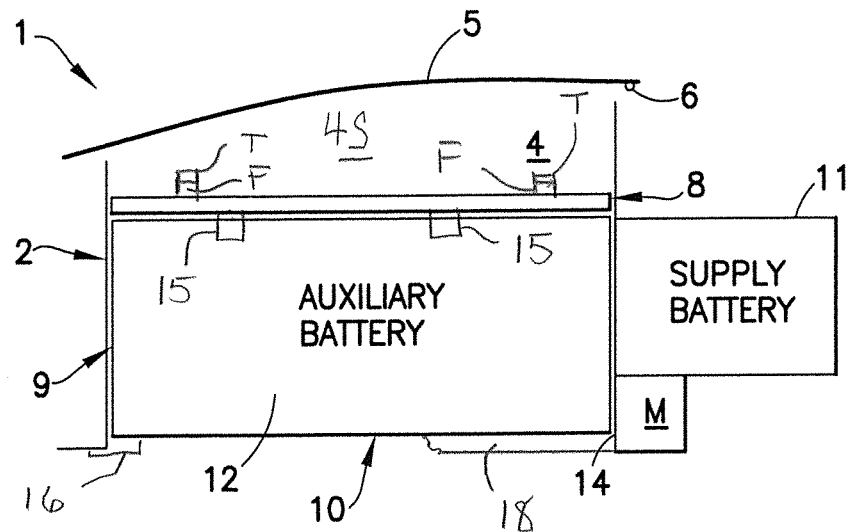
FIG. 2 is the same view as in FIG. 1 with the trunk compartment floor in a battery position.

FIGS. 1 and 2 illustrate, in a highly simplified manner, a motor vehicle 1 having a vehicle body 2. The vehicle body 2 comprises a trunk compartment 4 that is closed by a trunk compartment lid 5. The trunk compartment lid 5 can pivot about a pivot axis 6 at a forward end of the trunk compartment 4 to open the trunk compartment 4 for providing access to the trunk compartment for storage of articles such as luggage and groceries.

The trunk compartment 4 is delimited by a horizontal trunk compartment floor 8 with a top surface 8T on which the luggage, groceries and such can be stored and a bottom surface 8B opposite the top surface 8T. The trunk compartment 4 also is delimited by a front wall 4F, a rear wall 4R and opposite left and right side walls 4S, only one of which is shown. At least lower parts of the walls 4F, 4R, 4S are substantially perpendicular to the trunk compartment floor 8 and substantially adjacent to the trunk compartment floor 8. The floor 8 of the trunk compartment 4 can be adjusted in height toward and away from the trunk compartment lid 5, while maintaining the substantially horizontal alignment of the trunk compartment floor 8. Vertical adjustment of the trunk compartment floor 8 changes the distance of the trunk compartment lid 5 from the trunk compartment floor 8, and therefore changes the volume of the trunk compartment 4. Movement of the trunk compartment floor 8 preferably is carried out by using a motor M. The substantially horizontal alignment of the trunk compartment floor 8 is maintained during this movement by rails or tracks T in the walls 4F, 4R and/or 4S and corresponding followers F formed on or attached to the trunk compartment floor 8. The engagement of the followers F and the tracks T impedes separation of the trunk compartment floor 8 from the vehicle 1 and also adjustably locks the trunk compartment floor 8 at plural adjustable height positions so that the trunk compartment floor 8 can support the weight of groceries, luggage or the like that may be stored in the trunk compartment 4. The motor M delivers the motive power for moving the trunk compartment floor 8 by rotating at least one pinion gear mounted to the trunk compartment floor 8 relative to a rack associated with the walls 4F, 4R and/or 4S. Alternatively, the motive power can be delivered by at least one worm gear associated with the rails or tracks T, arrangements of pulleys and cables or a plurality of synchronized motors M. A flexible driveshaft, such as a cardan shaft can be used to transmit the forces for raising and lowering from one of the trunk compartment floor 8 to an opposite side thereof.

Areas of the motor vehicle 1 below the trunk compartment floor 8 are open or openable to the surface on which the motor vehicle 1 is supported. Thus, movement of the trunk compartment floor 8 into the upper position shown in FIG. 2 creates an accommodation compartment 9 below the trunk compartment floor 8 and opened toward the surface on which the vehicle 1 is supported. Thus, the accommodation compartment 9 is delimited by the bottom surface 8B of the trunk compartment floor 8 and lower parts of the walls 4F, 4R, 4S of the trunk compartment 4.

FIG. 1 shows the trunk compartment floor 8 arranged right at a loading position in which the trunk compartment floor 8 is arranged a maximum distance from the trunk compartment lid 5. Therefore, the trunk compartment 4 is at its maximum volume.

FIG. 2 shows the trunk compartment floor 8 moved up toward the trunk compartment lid 5 and into a battery position. As a result, the volume of the trunk compartment 4 is reduced considerably. At the same time, an accommodation space 9 is created beneath the trunk compartment floor 8. The accommodation space 9 functions to accommodate a component battery system 10. The component battery system 10 comprises an auxiliary battery 12 arranged in the accommodation space 9 beneath the trunk compartment floor 8.

The component battery system 10 is part of a battery system that comprises a supply battery 11 that supplies electrical power to an electric motor 1, which preferably is part of a hybrid vehicle or an electric vehicle.

The supply battery 11 of the battery system preferably is installed permanently in the motor vehicle 1. In contrast, the auxiliary battery 12 of the component battery system 10 can be removed from the accommodation space 9 or exchanged for another auxiliary battery. When the auxiliary battery 12 is removed from the accommodation space 9, the trunk compartment floor 8 can be lowered to its loading position, as illustrated in FIG. 1.

The accommodation space 9 preferably is accessible from below for the purpose of inserting or removing the auxiliary battery 12. To this end, a suitable opening 14 is provided in the vehicle body 2, below the trunk compartment floor 8. The size of the opening 14 is matched to the size of the auxiliary battery 12 and to the size of the trunk compartment floor 8. The auxiliary battery 12 can be positioned to align with the accommodation space 9 by wheeling the auxiliary battery 12 on a dolly or the like into a position for alignment with the opening 14 of the accommodation space 9 and then elevating the story battery 12 by a jack that may be associated with the dolly. Alternatively, an appropriate lifting mechanism may be associated with the vehicle 1. For example, the the bottom surface 8B of the trunk compartment floor 8 may include grips 15 for engaging the auxiliary battery 12 that has been positioned approximately in alignment with the opening 14 to the accommodation space 9. The motor M then will simultaneously elevate both the trunk compartment floor 8 and the auxiliary battery 12 as the accommodation space 9 is being created. Latches 16 or other supporting structures can be provided on the motor vehicle 1 for supporting the auxiliary battery 12 in the accommodation space 9. The opening 14 can be closed by a cover 18. Therefore, a large portion of the trunk compartment 4 can be used either as a storage space, as shown in FIG. 1, or as an accommodation space 9 for an auxiliary battery 12, as shown in FIG. 2.

What is claimed is:

1. A motor vehicle comprising:

a supply battery for providing electric power to drive the vehicle;

a trunk compartment having an upper opening and a lower opening and a plurality of side walls extending substantially vertically therebetween, a trunk compartment floor extending between inwardly facing surfaces of the plurality of side walls to define a storage space above the trunk compartment floor and an accommodation space below the trunk compartment floor, the trunk compartment floor being vertically translatable along the inwardly facing surfaces of the side walls between a lower position where the trunk compartment floor is substantially at lower ends of the side walls and an upper position where the trunk compartment floor is in proximity to the upper ends of the side walls to adjust a storage space volume and an accommodation space volume;

a lid that is hinged to a top end of one of the plurality of side walls at the upper opening and opposed to the trunk compartment floor, the lid being selectively openable for providing access to the storage space of the trunk compartment between the trunk compartment floor and the lid, and at least one auxiliary battery selectively insertable into the accommodation space through the lower opening for increasing a driving range of the vehicle and removable from the accommodation space through the lower opening for reducing weight and changing vehicle dynamics, wherein the trunk compartment floor is moved to the upper position to increase the accommodation space volume for accommodating the auxiliary battery and the trunk compartment floor is moved to the lower position when the auxiliary battery is removed to increase the storage space volume.

2. The motor vehicle of claim 1, wherein the trunk compartment floor is manually adjustable vertically.

3. The motor vehicle of claim 1, further comprising a motor for vertically adjusting positions of the trunk compartment floor.

4. The motor vehicle of claim 3, further comprising tracks arranged in vertical walls of the trunk compartment and followers mounted to the trunk compartment floor for guiding the vertical movement of the trunk compartment floor while maintaining a substantially horizontal alignment of the trunk compartment floor.

5. The motor vehicle of claim 4, wherein at least one of the tracks includes a rack having a vertical array of teeth, at least one pinion gear rotatably mounted on the trunk compartment floor and driven by the motor for selectively raising and lowering the trunk compartment floor.

6. The motor vehicle of claim 4, wherein at least one of the tracks includes a worm gear, at least one follower being mounted on the trunk compartment floor and being engaged with the worm gear, the worm gear being selectively driven by the motor for selectively raising and lowering the trunk compartment floor.

7. The motor vehicle of claim 4 further comprising latches on the vehicle for supporting the auxiliary battery in the accommodation space.

8. The motor vehicle of claim 3, wherein the trunk compartment floor includes grips for engaging the auxiliary battery so that the auxiliary battery is lifted into the accommodation space as the motor moves the trunk compartment floor up for defining the accommodation space.

* * * * *